(12) United States Patent
Yang

(10) Patent No.: US 9,253,634 B2
(45) Date of Patent: Feb. 2, 2016

(54) KEY UPDATING METHOD, DEVICE AND SYSTEM

(71) Applicant: China Academy of Telecommunications Technology, Beijing (CN)

(72) Inventor: Yi Yang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/407,749

(22) PCT Filed: Jun. 8, 2013

(86) PCT No.: PCT/CN2013/076992
§ 371 (c)(1),
(2) Date: Dec. 12, 2014

(87) PCT Pub. No.: WO2013/185579
PCT Pub. Date: Dec. 19, 2013

(65) Prior Publication Data
US 2015/0126154 A1      May 7, 2015

(30) Foreign Application Priority Data
Jun. 15, 2012    (CN) .......................... 2012 1 0201548

(51) Int. Cl.
*H04M 1/66*  (2006.01)
*H04W 12/04* (2009.01)
(Continued)

(52) U.S. Cl.
CPC .......... *H04W 12/04* (2013.01); *H04W 36/0038* (2013.01); *H04W 36/24* (2013.01); *H04W 36/28* (2013.01); *H04W 88/08* (2013.01)

(58) Field of Classification Search
CPC ..... H04W 12/04; H04W 36/28; H04W 36/24; H04W 36/0038; H04W 88/08
USPC .......................................... 455/411
See application file for complete search history.

(56) References Cited

U.S. PATENT DOCUMENTS

2010/0202618 A1*  8/2010  Yang ..................... H04L 63/068
                                                                    380/277
2011/0080875 A1*  4/2011  Yang ..................... H04L 63/068
                                                                    370/328

(Continued)

FOREIGN PATENT DOCUMENTS

CN    101483516    7/2009
CN    101938742    1/2011

(Continued)

OTHER PUBLICATIONS

International Search Report for PCT/CN2013/076992 mailed Sep. 19, 2013 (including English translation).

(Continued)

*Primary Examiner* — Juan A Torres
(74) *Attorney, Agent, or Firm* — Foley & Lardner LLP; James F. Ewing; Paul M. H. Pua

(57) ABSTRACT

The present invention relates to communications technologies, and disclosed are a key updating method, device, and system. A local eNB monitors a user plane uplink and downlink PDCP COUNT value of each UE connected thereto, and transmits user plane uplink and downlink PDCP COUNT value information or transmits a key update request based on the PDCP COUNT value to a macro eNB, so that the macro eNB updates a key according to the key update request or the user plane uplink and downlink PDCP COUNT value information, thereby avoiding the problem of repeated use of security parameters, realizing prompt key update, and improving the security performance of the network.

20 Claims, 6 Drawing Sheets

(51) Int. Cl.
*H04W 36/00* (2009.01)
*H04W 36/24* (2009.01)
*H04W 36/28* (2009.01)
*H04W 88/08* (2009.01)

(56) References Cited

U.S. PATENT DOCUMENTS

2013/0114813 A1* 5/2013 Chai .................. H04W 12/04 380/270
2013/0310006 A1* 11/2013 Chen .................. H04W 12/04 455/411

FOREIGN PATENT DOCUMENTS

| CN | 102281535 | 12/2011 |
| CN | 102348244 | 2/2012 |
| CN | 102740289 | 10/2012 |
| EP | 2574103 | 3/2013 |
| WO | WO-2011/153925 | 12/2011 |

OTHER PUBLICATIONS

Extended European Search Report for EP Application No. 13804942.4 mailed Sep. 2, 2015.

Huawei: "Key interaction on Un interface", 3GPP Draft; S3-101240-Key Interaction on UN Interface, 3rd Generation Partnership Project (3GPP), Mobile Competence Centre; 650, Route Des Lucioles ; F-06921 Sophia-Antipolis Cedex ; France, vol. SA WG3, No. Sorrento, Italy, Nov. 8, 2010, XP050636295, [retrieved on Nov. 8, 2010] * paragraph [8.8.2] *.

* cited by examiner

--Prior Art--

--Prior Art--

--Prior Art—

--Prior Art--

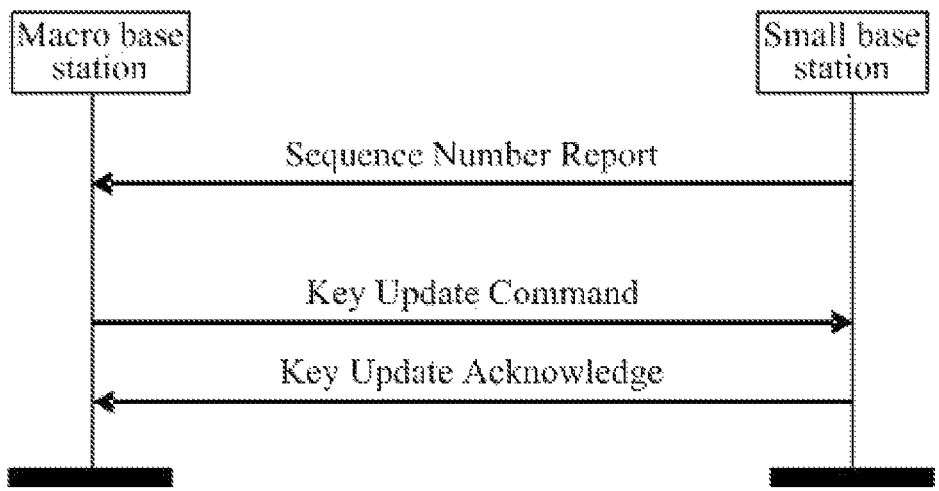

Fig.9

A macro base station receives a key update request transmitted by a small base station thereto as a function of user plane uplink PDCP count value or user plane downlink PDCP count value, or information transmitted by the small base station thereto about the user plane uplink PDCP count value or the user plane downlink PDCP count value — S1001

The macro base station updates a key in response to the key update request or according to the information about the user plane uplink PDCP count value or the user plane downlink PDCP count value — S1002

Fig.10

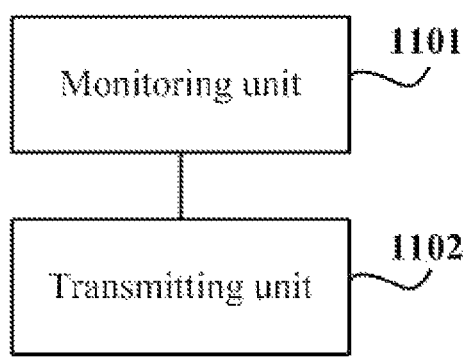

Fig.11

KEY UPDATING METHOD, DEVICE AND SYSTEM

This application is a US National Stage of International Application No. PCT/CN2013/076992, filed on Jun. 8, 2013, designating the United States, and claiming the benefit of Chinese Patent Application No. 201210201548.3, filed with the Chinese Patent Office on Jun. 15, 2012 and entitled "Method, apparatus and system for updating key", which is hereby incorporated by reference in its entirety.

FIELD OF THE INVENTION

The present invention relates to the field of communications and particularly to a method, apparatus and system for updating a key.

BACKGROUND OF THE INVENTION

Along with rapid development of smart terminals, there are constantly growing demands of users for the rates and capacities of data services, and thus a traditional single-layer network of coverage by a macro base station (macro eNB) has failed to accommodate the demands of the users. In view of this, this problem has been addressed in the Third-Generation Partnership Project (3GPP) by hierarchical networking so that some low-power base stations (in the forms of femto/pico/relay node or the like) are deployed in an environment with small coverage including a hotspot area, an indoor environment at home, an office environment or the like for the purpose of cell splitting to enable an operator to provide a user with a service at a higher data rate and a lower cost.

However there may be some negative effect accompanying an increase in capacity of the network due to hierarchical networking, where a cell of a low-power base station has such a small coverage area that a moving User Equipment (UE) is handed over too frequently, thus adding a risk of interrupted communication of the UE during the handover.

FIG. 1 illustrates the network architecture of an Evolved Universal Terrestrial Radio Access Network (E-UTRAN), where the E-UTRAN is composed of evolved base stations (eNBs). An eNB functions as an access network and communicates with the UE via an air interface. There are both a control plane connection and a user plane connection between the UE and the eNB. For each UE attached to the network, there is a Mobility Management Entity (MME) serving the UE, and the MME and the eNB are connected with an S1-MME interface. The S1-MME interface provides the UE with a service including the functions of mobility management and bearer management to the control plane.

A Serving Gateway (S-GW) and the eNB are connected with an S1-U interface, and for each UE attached to the network, there is an S-GW serving the UE. The S1-U interface provides the UE with a service to the user plane, and user plane data of the UE is transmitted between the S-GW and the eNB over a bearer of the S1-U interface.

In the existing hierarchical network as illustrated in FIG. 2, the macro base station provides basic coverage, and a low-power small base station (a local eNB) provides hotspot coverage, where there is a data/signaling interface (which may be a wired or wireless interface) between the local eNB and the macro eNB, and the UE can operate under the macro eNB or the local eNB. Since a cell controlled by the local eNB has a small coverage area and there are a small number of UEs served by the local eNB, the UE connected with the local eNB tends to be provided with a better quality of service, e.g., a higher traffic rate, a higher-quality link, etc. Thus when the UE connected with the macro eNB approaches the cell controlled by the local eNB, the UE can be handed over to the local eNB to be served by the local eNB; and when the UE moves away from the cell controlled by the local eNB, the UE needs to be handed over to a cell by the macro eNB to maintain the wireless connection.

In order to lower the risk of dropped call, there is proposed a network architecture in which the user plane can be separated from the control plane, where the network architecture involves a scenario with hierarchical network deployment of local and macro eNBs.

FIG. 2 illustrates the network architecture in which the user plane can be separated from the control plane. In this way, when the UE is located in the area covered by only the cell of the macro eNB, both the control plane connection and the user plane connection of the UE are active at the macro eNB; and when the UE moves to the area covered by both the cell of the macro eNB cell and the cell of the local eNB, (all or a part of) the user plane bearer connection of the UE is handed over to the local eNB for a higher traffic rate; and the control plane connection is still maintained at the macro eNB to thereby prevent a dropped call of the UE due to a failure in the control plane connection handover.

In the event that the user plane of the UE is separated from the control plane, the UE is connected with both of the eNBs concurrently.

In the event that user plane is separated from the control plane, FIG. 3 and FIG. 4 illustrate protocol stacks between the UE and the network. The user plane eNB of the UE (e.g., the local eNB, when a part of the user plane bearer of the UE is active at the local eNB, the macro eNB is also provided with the user plane protocol stack) provides the UE with the function of transmitting user plane data but without any peer Radio Resource Control (RRC) layer provided for the UE so that no RRC control can be performed on the UE; and the control plane eNB of the UE (e.g., the macro eNB) provides the UE with the function of transmitting a control plane message, and in order to carry and process an RRC message, the macro eNB needs to be provided with a peer user plane protocol stack for the UE. Since a Non-Access Stratum (NAS) message needs to be carried in an RRC message, the serving MME of the UE is connected with the control plane eNB of the UE.

In the existing protocol, an RRC connection is composed of three Signaling Radio Bearers (SRBs), which are an SRB0, an SRB1 and an SRB2, where no processing at the Packet Data Convergence Protocol (PDCP) layer is necessary for the SRB0. At the user plane, a plurality of Data Radio Bearers (DRBs) can be set up between the UE and the eNB. PDCP entities correspond to the DRBs/SRB1/SRB2, and each DRB, the SRB1 and the SRB2 correspond respectively to a set of PDCP entities. Thus there may be a plurality of sets of PDCP entities for the UE.

Security of the air interface between the UE and the eNB is protected at the PDCP layer. An RRC message is encrypted and integrity protected at the PDCP layer, and a user data packet transmitted over a DRB is encrypted for protection. The UE and the eNB negotiate in the RRC message about a security algorithm of the air interface and calculate a key for the air interface and then configure the Packet Data Convergence Protocol (PDCP) layer with the key for use.

Each data packet is assigned with a sequence number, denoted as a count value, at the PDCP layer. The UE and the eNB maintain an uplink count value and a downlink count value respectively for each PDCP entity. The count values increase gradually as the data packets are transmitted until they reach their maximums wrap around to zero.

For security protection, the count values at the PDCP layers are one of input parameters, where each count value is used only once. The count values are introduced to thereby ensure that each data packet is encrypted or integrity protected using different security parameters so as to lower the possibility of cracking information contents by an intruder. The eNB and UE will change the key by handover when the counts reach their maximums. At present the length of the counts is 32 bits.

For the architecture where there are only user plane functions on the local eNB, the local eNB can not update the key for the air interface but the key will be updated by the macro eNB. Neither can the macro eNB be aware real time information about the count values at the PDCP layer on the local eNB nor can the local eNB be aware of information about the PDCP count values corresponding to the SRBs or a part of the DRBs (if any) on the macro eNB.

Since the key update process is typically performed by the macro eNB, when some PDCP count value of some UE reaches a preset value, the key update flow is initiated to update the key. However since the macro eNB can not be aware of real time information about the count values at the PDCP layer on the local eNB, such a situation may occur that PDCP count value of some DRB on the local eNB has wrapped around whereas the original user plane key is still being used between the UE and the local eNB so that the same set of security parameters have been used twice, thus increasing the possibility of cracking communication information of the UE by the intruder and degrading the security performance of the network.

SUMMARY OF THE INVENTION

Embodiments of the invention provide a method, apparatus and system for updating a key so as to improve the security performance of a network.

An embodiment of the invention provides a method of updating a key, the method including:

a small base station monitoring user plane uplink PDCP count value or user plane downlink PDCP count value of each UE connected with the small base station; and the small base station transmitting a key update request as a function of the user plane uplink PDCP count value or the user plane downlink PDCP count value to a macro base station so that the macro base station updates a key in response to the key update request or the small base station transmitting information about the user plane uplink PDCP count value or the user plane downlink PDCP count value to the macro base station so that the macro base station updates a key according to the information about the user plane uplink PDCP count value or the user plane downlink PDCP count value.

An embodiment of the invention provides a method of updating a key, the method including:

a macro base station receiving a key update request transmitted by a small base station to the macro base station as a function of user plane uplink PDCP count value or user plane downlink PDCP count value, or information transmitted by the small base station to the macro base station about the user plane uplink PDCP count value or the user plane downlink PDCP count value; and the macro base station updating a key in response to the key update request or according to the information about the user plane uplink PDCP count value or the user plane downlink PDCP count value.

An embodiment of the invention provides an apparatus for updating a key, the apparatus including:

a monitoring unit configured to monitor user plane uplink PDCP count value or user plane downlink PDCP count value of each UE connected with the apparatus;

a transmitting unit configured to transmit a key update request as a function of the user plane uplink PDCP count value or the user plane downlink PDCP count value to a macro base station so that the macro base station updates a key in response to the key update request or to transmit information about the user plane uplink PDCP count value or the user plane downlink PDCP count value to the macro base station so that the macro base station updates a key according to the information about the user plane uplink PDCP count value or the user plane downlink PDCP count value.

An embodiment of the invention provides an apparatus for updating a key, the apparatus including:

a receiving unit configured to receive a key update request transmitted by a small base station to a macro base station as a function of user plane uplink PDCP count value or user plane downlink PDCP count value, or information transmitted by the small base station to the macro base station about the user plane uplink PDCP count value or the user plane downlink PDCP count value; and an updating unit configured to update a key in response to the key update request or according to the information about the user plane uplink PDCP count value or the user plane downlink PDCP count value.

An embodiment of the invention provides a system for updating a key, the system including a small base station and a macro base station, wherein:

the small base station is configured to monitor user plane uplink PDCP count value or user plane downlink PDCP count value of each UE connected with the small base station; and to transmit a key update request as a function of the user plane uplink PDCP count value or the user plane downlink PDCP count value to a macro base station or to transmit information about the user plane uplink PDCP count value or the user plane downlink PDCP count value to the macro base station; and the macro base station is configured to receive the key update request transmitted by the small base station to the macro base station as a function of the user plane uplink PDCP count value or the user plane downlink PDCP count value, or the information transmitted by the small base station to the macro base station about the user plane uplink PDCP count value or the user plane downlink PDCP count value; and to update a key in response to the key update request or according to the information about the user plane uplink PDCP count value or the user plane downlink PDCP count value.

The embodiments of the invention provide a method, apparatus and system for updating a key, where a small base station monitors user plane uplink PDCP count value or user plane downlink PDCP count value of each UE connected with the small base station and transmits information about the user plane uplink PDCP count value or the user plane downlink PDCP count value to a macro base station so that the macro base station updates a key according to the information about the user plane uplink PDCP count value or the user plane downlink PDCP count value, or transmits a key update request as a function of the PDCP count values to a macro base station so that the macro base station updates a key in response to the key update request to thereby avoid security parameters from being reused so as to update the key in a timely manner and improve the security performance of the network.

BRIEF DESCRIPTION OF THE DRAWINGS

FIG. 9 illustrates a flow chart of transmission of messages according to the second embodiment of the invention;

FIG. 10 illustrates a second flow chart of a method of updating a key according to an embodiment of the invention;

FIG. 11 illustrates a first schematic structural diagram of an apparatus for updating a key according to an embodiment of the invention;

DETAILED DESCRIPTION OF THE EMBODIMENTS

Embodiments of the invention provide a method, apparatus and system for updating a key, where a small base station monitors user plane uplink PDCP count value or user plane downlink PDCP count value of each UE connected with the small base station and transmits information about the user plane uplink PDCP count value or the user plane downlink PDCP count value to a macro base station so that the macro base station updates a key according to the information about the user plane uplink PDCP count value or the user plane downlink PDCP count value, or transmits a key update request as a function of the PDCP count values to a macro base station so that the macro base station updates a key in response to the key update request to thereby avoid security parameters from being reused so as to update the key in a timely manner and improve the security performance of the network.

Figure 1:
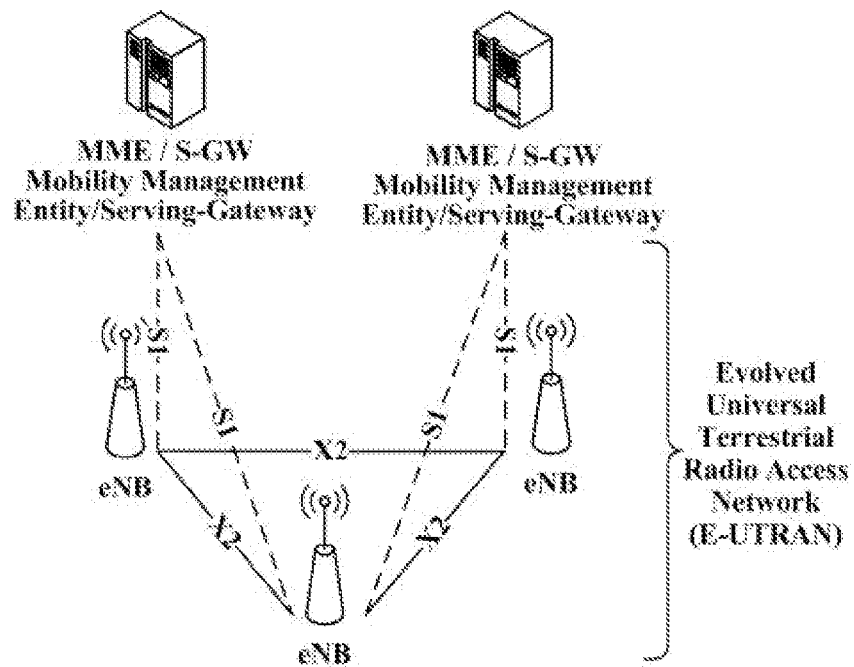
FIG. 1 illustrates the network architecture of the Evolved Universal Terrestrial Radio Access Network (E-UTRAN) in the prior art.
Figure 2:
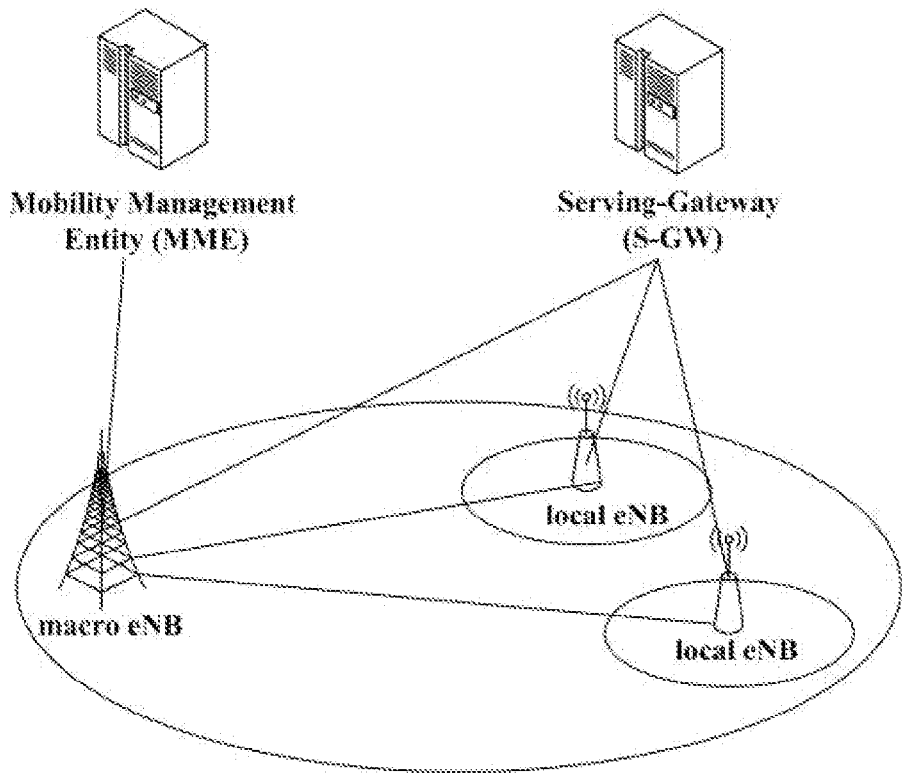
FIG. 2 illustrates a schematic diagram of the scenario with layered deployment of the network in the prior art.
Figure 3:
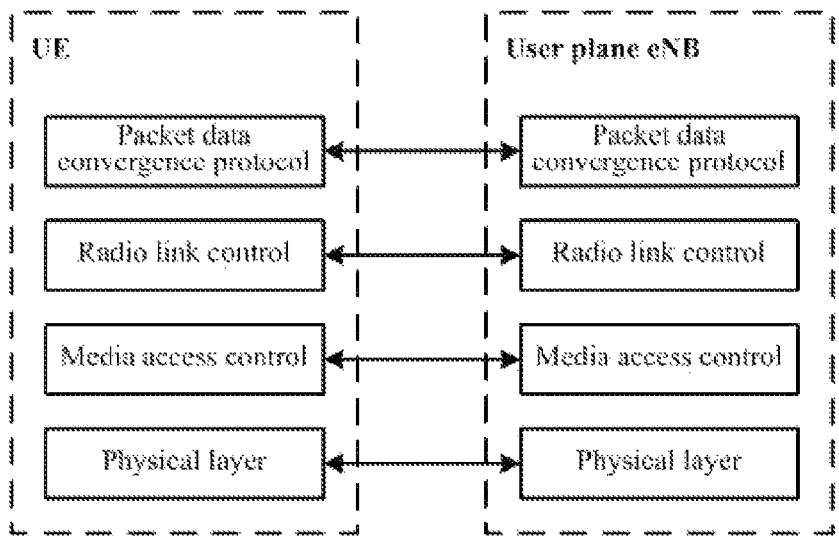
FIG. 3 illustrates a schematic diagram of the user plane protocol stack in the prior art.
Figure 4:
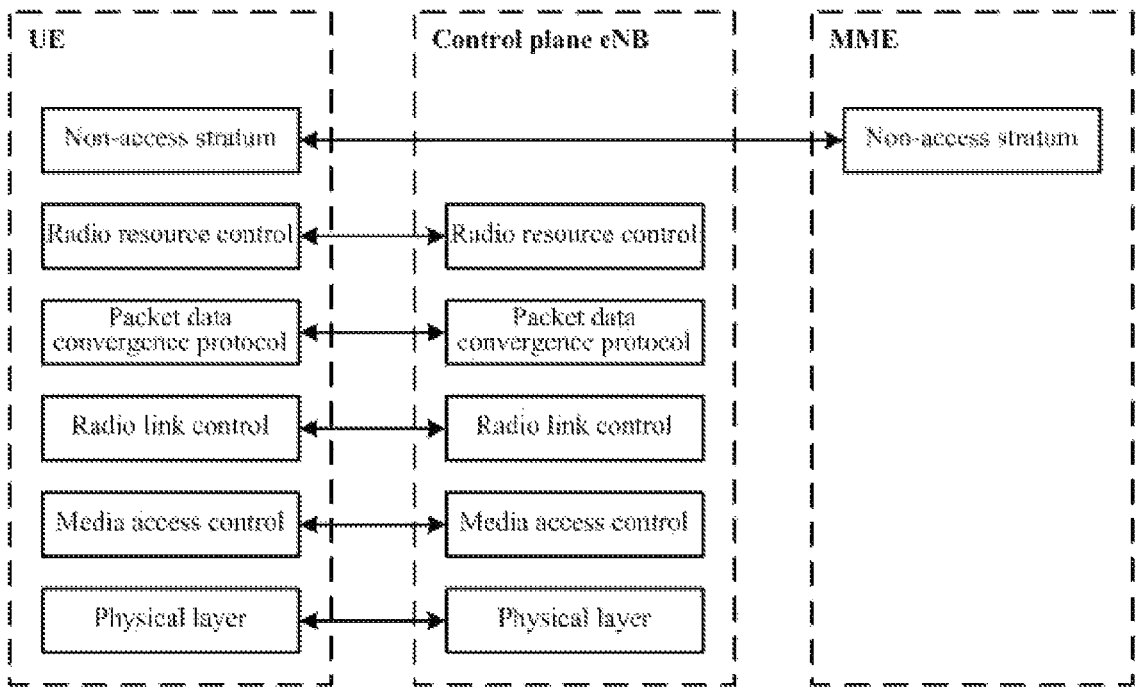
FIG. 4 illustrates a schematic diagram of the control plane protocol stack in the prior art.
Figure 5:
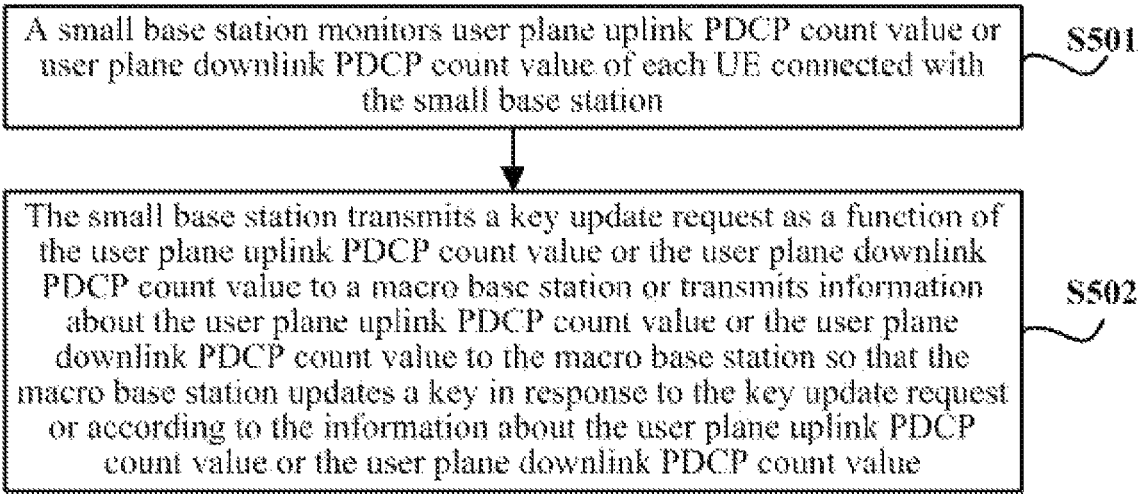
FIG. 5 illustrates a first flow chart of a method of updating a key according to an embodiment of the invention.

As illustrated in FIG. 5, a method of updating a key according to an embodiment of the invention includes:

In the step S501, a small base station monitors user plane uplink PDCP count value or user plane downlink PDCP count value of each UE connected with the small base station; and IN the step S502, the small base station transmits a key update request as a function of the user plane uplink PDCP count value or the user plane downlink PDCP count value to a macro base station so that the macro base station updates a key in response to the key update request or transmits information about the user plane uplink PDCP count value or the user plane downlink PDCP count value to the macro base station so that the macro base station updates a key according to the information about the user plane uplink PDCP count value or the user plane downlink PDCP count value.

Particularly in the step S502, the small base station transmits the key update request as a function of the user plane uplink PDCP count value or the user plane downlink PDCP count value to the macro base station so that the macro base station updates a key in response to the key update request or transmits the information about the user plane uplink PDCP count value or the user plane downlink PDCP count value to the macro base station so that the macro base station updates a key according to the information about the user plane uplink PDCP count value or the user plane downlink PDCP count value particularly in the following two particular implementations:

In a first implementation, the small base station transmits the key update request including identifier information of a UE, for which a key needs to be updated, to the macro base station upon determining that the user plane uplink PDCP count value or the user plane downlink PDCP count value reaches a preset value; and at this time the macro base station updates the key for the UE according to the identifier information upon reception of the key update request; and In a second implementation, the small base station transmits the user plane uplink PDCP count value or the user plane downlink PDCP count value of each UE to the macro base station dependent upon a preset report condition; and at this time for each UE, the macro base station updates the key for the UE upon determining that one of the user plane uplink PDCP count value, the user plane downlink PDCP count value, a control plane uplink PDCP count value and a control plane downlink PDCP count value of the UE reaches a preset value.

Particularly the preset report condition is as follows:

There is such at least one of the user plane uplink PDCP count value or the user plane downlink PDCP count value that changes by a preset threshold or more; or There has been a preset period of time since a last report.

Particularly the macro base station updates the key for the UE in the following particular process:

The macro base station initiates an intra-cell handover procedure so that the macro base station calculates with the UE a new key for Radio Resource Control (RRC) message and user plane data; and The macro base station returns a key update response message carrying the new key to the small base station.

In order to further ensure the data to be decrypted correctly, transmission of the data can be avoided as much as possible in the update key process, and at this time the method further includes:

The UE transmits no uplink data for a preset period of time but decrypts received downlink data using the new key and the old key after the key is updated; or The small base station neither transmits downlink data to the UE nor schedules the UE to transmit uplink data for a preset period of time after transmitting the key update request to the macro base station; or The macro base station transmits a notification message to the small base station upon determining from the user plane uplink PDCP count value, the user plane downlink PDCP count value, the control plane uplink PDCP count value and the control plane downlink PDCP count value of the UE that the key is to be updated for the UE, and the small base station neither transmits downlink data to the UE nor schedules the UE to transmit uplink data for a preset period of time after receiving the notification message.

The method of updating a key according to the embodiment of the invention will be described below in particular embodiments thereof.

First Embodiment

In this embodiment, a small base station triggers a key update according to user plane uplink PDCP count value or user plane downlink PDCP count value of a UE.

Figure 6:
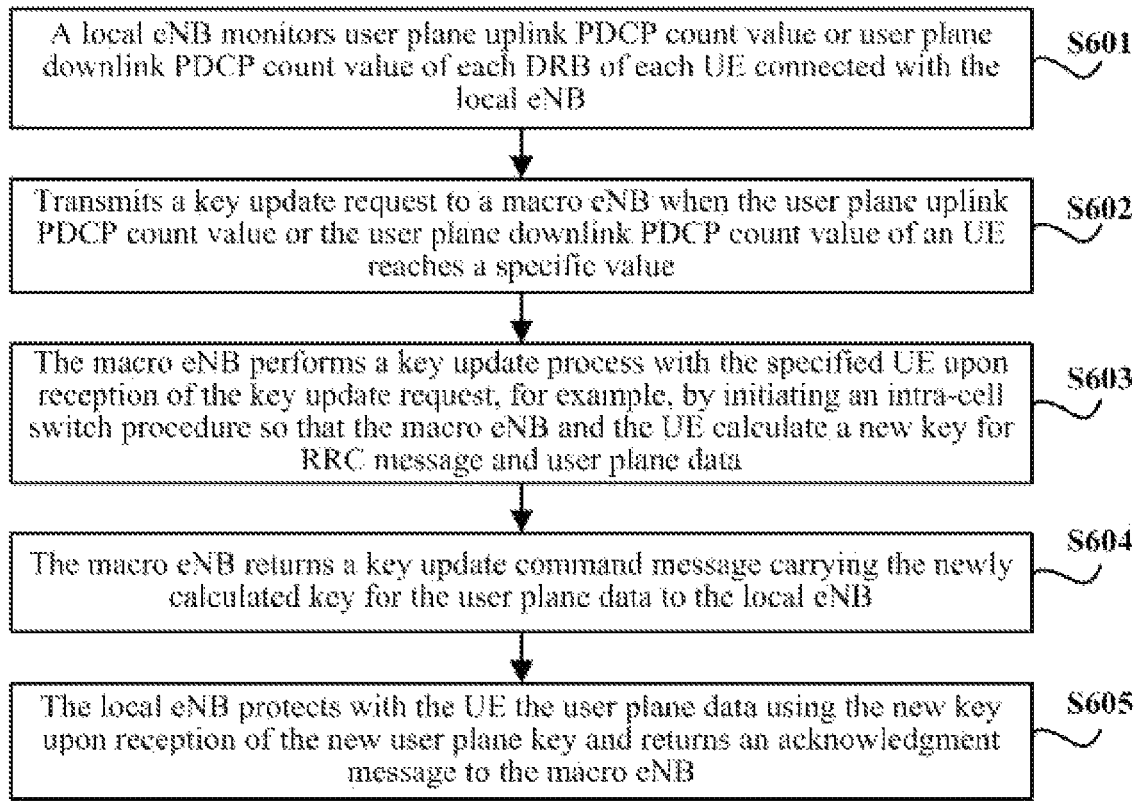
FIG. 6 illustrates a flow chart of a method of updating a key according to a first embodiment of the invention.

As illustrated in FIG. 6, the method includes:

In the step S601, a local eNB monitors user plane uplink PDCP count value or user plane downlink PDCP count value of each DRB of each UE connected with the local eNB;

In the step S602, when the user plane uplink PDCP count value or the user plane downlink PDCP count value of an UE reaches a specific value, the local eNB transmits a key update request carrying the identifier of the UE to a macro eNB so that the macro eNB can identify the specific UE for which a key needs to be updated;

The identifier of the UE carried in the message can be a C-RNTI or can be an interface application layer identifier, and particularly the identifier can be transmitted to the local eNB before the macro eNB configures the local eNB with the DRBs, e.g., a C-RNTI, or can be an interface application layer identifier (e.g., an X2AP ID or an S1 AP ID) when the macro eNB configures the local eNB with the DRBs.

Since the local eNB receives a new key at some delay, in order to ensure no problem with decryption between the local eNB and the UE, the UE may transmit no uplink data for some period of time after the key is updated but decrypt downlink data received from the local eNB respectively using the new and old keys; or the local eNB may neither schedule the UE to transmit uplink data nor transmit downlink data to the UE until receiving the new key after transmitting the key update request to the macro eNB. Of course correct decryption can be ensured otherwise at both of the transmitting and receiving sides in the embodiment of the invention.

In the step 603, the macro eNB performs a key update process with the specified UE upon reception of the key update request, for example, by initiating an intra-cell handover procedure so that the macro eNB and the UE calculate a new key for RRC message and user plane data;

In the step 604, the macro eNB returns a key update command message carrying the newly calculated key for the user plane data to the local eNB; and In the step 605, the local eNB protects with the UE the user plane data using the new user plane key upon reception of the new key and returns an acknowledgment message to the macro eNB.

Figure 7:
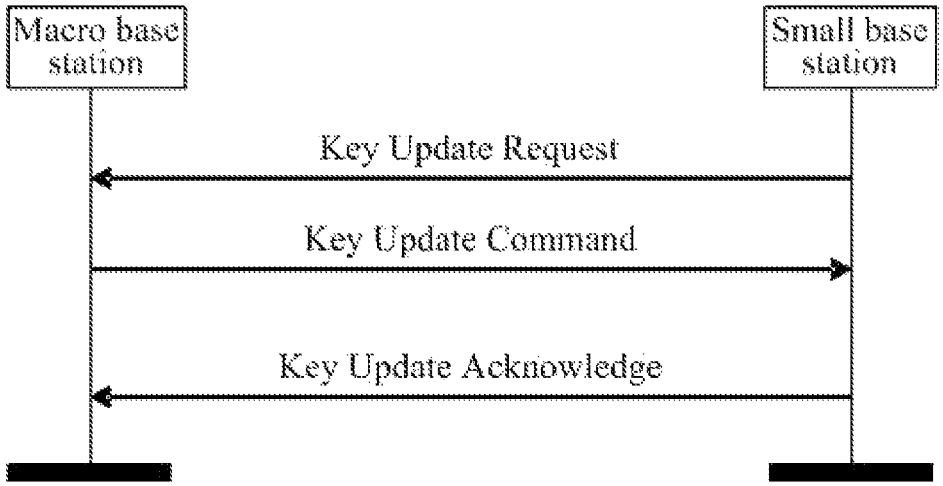
FIG. 7 illustrates a flow chart of transmission of messages according to the first embodiment of the invention.

Particularly the transmitted messages between the macro base station and the small base station can be embodied as messages illustrated in FIG. 7, where the small base station transmits a Key Update Request to the macro base station, the macro base station transmits a Key Update Command to the small base station upon determining the new key, and the small base station returns a Key Update Acknowledge to the macro base station.

Second Embodiment

In this embodiment, a small base station transmits user plane uplink PDCP count value or user plane downlink PDCP count value of respective UEs conditionally to a macro base station.

Figure 8:
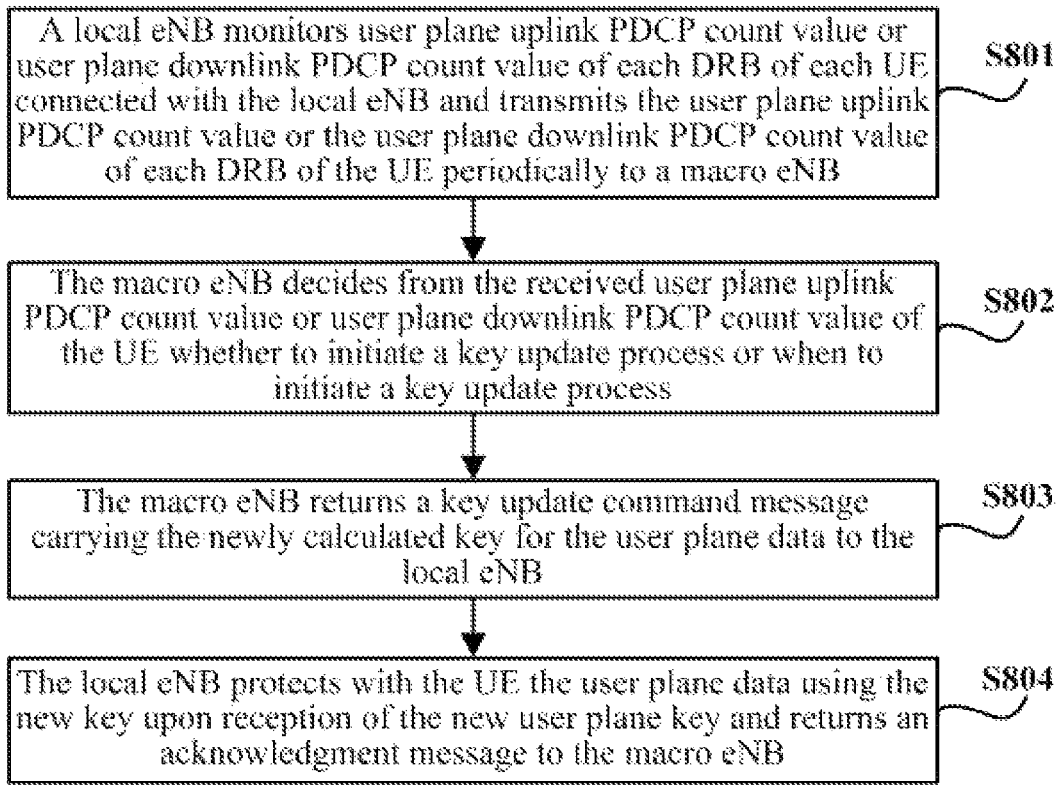
FIG. 8 illustrates a flow chart of a method of updating a key according to a second embodiment of the invention.

As illustrated in FIG. 8, the method includes the following steps:

In the step S801, a local eNB monitors user plane uplink PDCP count value or user plane downlink PDCP count value of each DRB of each UE connected with the local eNB and transmits the user plane uplink PDCP count value or the user plane downlink PDCP count value of each DRB of the UE conditionally to a macro eNB, for example, by transmitting the PDCP count values in a Sequence Number (SN) report message carrying the identifier of the UE;

"Conditionally" refers to that the user plane uplink PDCP count value or the user plane downlink PDCP count value are transmitted each time they are increased by some amount or transmitted each time some period of time elapses;

In the step S802, the macro eNB decides from the received user plane uplink PDCP count value or user plane downlink PDCP count value of the UE whether to initiate a key update process or when to initiate a key update process. Upon determining that an air interface key needs to be updated, the macro eNB performs a key update process with the specified UE, for example, by initiating an intra-cell handover procedure so that the macro eNB and the UE calculate a new key for RRC message and user plane data;

Since the local eNB receives a new key at some delay, in order to ensure no problem with decryption between the local eNB and the UE, the UE may transmit no uplink data for some period of time after the key is updated but decrypt downlink data received from the local eNB respectively using the new and old keys; or the macro eNB firstly notifies the local eNB after deciding to update the key with the UE. The local eNB may neither schedule the UE to transmit uplink data nor transmit downlink data to the UE until receiving the new key after receiving the notification. Of course correct decryption can be ensured otherwise at both of the transmitting and receiving sides in the embodiment of the invention.

In the step 803, the macro eNB returns a key update command message carrying the newly calculated key for the user plane data to the local eNB; and In the step 804, the local eNB protects with the UE the user plane data using the new user plane key upon reception of the new key and returns an acknowledgment message to the macro eNB.

Particularly the transmitted messages between the macro base station and the small base station can be embodied as messages illustrated in FIG. 9, where the small base station transmits the user plane uplink PDCP count value or the user plane downlink PDCP count value of the respective UEs to the macro base station in an SN report, the macro base station transmits a Key Update Command to the small base station upon determining the new key, and the small base station returns a Key Update Acknowledge to the macro base station.

In the embodiment of the invention, the control plane base station and the user plane base station monitor control plane PDCP count values and the user plane PDCP count values of the UE respectively, and both of them can update an air interface key when any of the count values reaches a preset value to thereby update the key in a timely manner.

An embodiment of the invention further provides a method of updating a key, and as illustrated in FIG. 10, the method includes:

In the step S1001, a macro base station receives a key update request transmitted by a small base station to the macro base station as a function of user plane uplink PDCP count value or user plane downlink PDCP count value, or information transmitted by the small base station to the macro base station about the user plane uplink PDCP count value or the user plane downlink PDCP count value;

In the step S1002, the macro base station updates a key in response to the key update request or according to the information about the user plane uplink PDCP count value or the user plane downlink PDCP count value.

In correspondence to the first embodiment, in the step S1001, the macro base station receives the key update request transmitted by the small base station to the macro base station as a function of the user plane uplink PDCP count value or the user plane downlink PDCP count value particularly as follows:

The macro base station receives the key update request transmitted by the small base station to the macro base station upon the small base station determines that the user plane uplink PDCP count value or the user plane downlink PDCP count value reaches a preset value, where the key update request includes identifier information of a UE for which a key needs to be updated; and At this time in the step S1002, the macro base station updates the key in response to the key update request particularly as follows:

The macro base station updates the key for the UE according to the identifier information upon reception of the key update request.

In correspondence to the second embodiment, in the step S1001, the macro base station receives the information about the user plane uplink PDCP count value or the user plane downlink PDCP count value transmitted by the small base station particularly as follows:

The macro base station receives the user plane uplink PDCP count value or the user plane downlink PDCP count value of each UE transmitted by the small base station dependent upon a preset report condition;

At this time in the step S1002, the macro base station updates the key according to the information about the user plane uplink PDCP count value or the user plane downlink PDCP count value particularly as follows:

For each UE, the macro base station updates the key for the UE upon determining that one of the user plane uplink PDCP count value, the user plane downlink PDCP count value, a control plane uplink PDCP count value and a control plane downlink PDCP count value of the UE reaches a preset value.

Particularly the preset report condition is as follows:

There is such at least one of the respective PDCP count values that changes by a preset threshold or more; or There has been a preset period of time since a last report.

Particularly the macro base station updates the key for the UE as follows:

The macro base station initiates an intra-cell handover procedure so that the macro base station calculates with the UE a new key for RRC message and user plane data; and The macro base station returns a key update response message carrying the new key to the small base station.

In correspondence to the first embodiment, in order to ensure correct decryption of the data, the UE transmits no uplink data but decrypts received downlink data using the new key and the old key for a preset period of time after the key is updated; or the small base station neither transmits downlink data to the UE nor schedules the UE to transmit uplink data for a preset period of time after transmitting the key update request to the macro base station; or In correspondence to the second embodiment, in order to ensure correct decryption of the data, the UE transmits no uplink data for a preset period of time but decrypts received downlink data using the new key and the old key after the key is updated; or the macro base station transmits a notification message to the small base station upon determining that the key is to be updated for the UE, and the small base station neither transmits downlink data to the UE nor schedules the UE to transmit uplink data for a preset period of time after receiving the notification message.

An embodiment of the invention provides an apparatus for updating a key, and the apparatus can be particularly a small base station as illustrated, the apparatus including:

A monitoring unit 1101 is configured to monitor user plane uplink PDCP count value or user plane downlink PDCP count value of each UE connected with the apparatus;

A transmitting unit 1102 is configured to transmit a key update request as a function of the user plane uplink PDCP count value or the user plane downlink PDCP count value to a macro base station so that the macro base station updates a key in response to the key update request or to transmit information about the user plane uplink PDCP count value or the user plane downlink PDCP count value to the macro base station so that the macro base station updates a key according to the information about the user plane uplink PDCP count value or the user plane downlink PDCP count value.

In correspondence to the first embodiment, the transmitting unit 1102 is particularly configured:

To transmit the key update request including identifier information of a UE, for which a key needs to be updated, to the macro base station upon determining that the user plane uplink PDCP count value or the user plane downlink PDCP count value reaches a preset value so that the macro base station updates the key for the UE according to the identifier information upon reception of the key update request.

In correspondence to the second embodiment, the transmitting unit 1102 is particularly configured:

To transmit the user plane uplink PDCP count value or the user plane downlink PDCP count value of each UE to the macro base station dependent upon a preset report condition so that for each UE, the macro base station updates the key for the UE upon determining that one of the user plane uplink PDCP count value, the user plane downlink PDCP count value, a control plane uplink PDCP count value and a control plane downlink PDCP count value of the UE reaches a preset value.

In correspondence to the first embodiment, the transmitting unit 1102 is further configured:

To neither transmit downlink data to the UE nor schedule the UE to transmit uplink data for a preset period of time after transmitting the key update request to the macro base station.

In correspondence to the first embodiment, the transmitting unit 1102 is further configured:

To receive a notification message transmitted by the macro base station upon determining that the key is to be updated for the UE and to neither transmit downlink data to the UE nor schedule the UE to transmit uplink data for a preset period of time after receiving the notification message.

Figure 12:
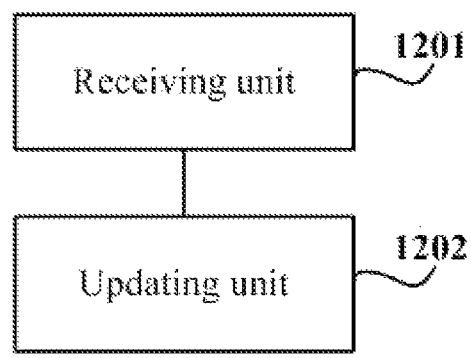
FIG. 12 illustrates a second schematic structural diagram of an apparatus for updating a key according to an embodiment of the invention.

An embodiment of the invention further provides an apparatus for updating a key, and the apparatus can be particularly a macro base station as illustrated in FIG. 12, the apparatus including:

A receiving unit 1201 is configured to receive a key update request transmitted by a small base station to a macro base station as a function of user plane uplink PDCP count value or user plane downlink PDCP count value, or information transmitted by the small base station to the macro base station about the user plane uplink PDCP count value or the user plane downlink PDCP count value; and An updating unit 1202 is configured to update a key in response to the key update request or according to the information about the user plane uplink PDCP count value or the user plane downlink PDCP count value.

In correspondence to the first embodiment, the receiving unit 1201 is particularly configured:

To receive the key update request transmitted by the small base station to the macro base station upon the small base station determines that the user plane uplink PDCP count value or the user plane downlink PDCP count value reaches a preset value, where the key update request includes identifier information of a UE for which a key needs to be updated; and At this time the updating unit 1202 is particularly configured:

To update the key for the UE according to the identifier information upon reception of the key update request.

In correspondence to the first embodiment, the receiving unit 1201 is particularly configured:

To receive the user plane uplink PDCP count value or the user plane downlink PDCP count value of each UE transmitted by the small base station dependent upon a preset report condition; and At this time the updating unit 1202 is particularly configured:

For each UE, to update the key for the UE upon determining that one of the user plane uplink PDCP count value, the user plane downlink PDCP count value, a control plane uplink PDCP count value and a control plane downlink PDCP count value of the UE reaches a preset value.

The updating unit 1020 configured to update the key for the UE is particularly configured:

To initiate an intra-cell handover procedure so that the macro base station calculates with the UE a new key for RRC message and user plane data; and To return a key update response message carrying the new key to the small base station.

In correspondence to the first embodiment, the updating unit 1202 is further configured:

To transmit a notification message to the small base station upon determining that the key is updated for the UE so that the small base station neither transmits downlink data to the UE nor schedules the UE to transmit uplink data for a preset period of time after receiving the notification message.

Figure 13:
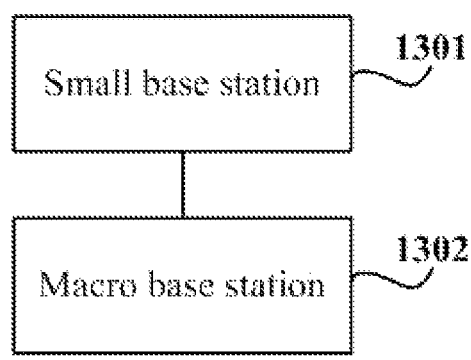
FIG. 13 illustrates a schematic structural diagram of a system for updating a key according to an embodiment of the invention.

An embodiment of the invention further correspondingly provides a system for updating a key as illustrated in FIG. 13, the system including a small base station 1301 and a macro base station 1302, where:

The small base station 1301 is configured to monitor user plane uplink PDCP count value or user plane downlink PDCP count value of each UE connected with the small base station; and to transmit a key update request as a function of the user plane uplink PDCP count value or the user plane downlink PDCP count value to a macro base station 1302 or to transmit information about the user plane uplink PDCP count value or the user plane downlink PDCP count value to the macro base station 1302; and The macro base station 1302 is configured to receive the key update request transmitted by the small base station 1301 to thereto as a function of the user plane uplink PDCP count value or the user plane downlink PDCP count value, or the information transmitted by the small base station thereto about the user plane uplink PDCP count value or the user plane downlink PDCP count value; and to update a key in response to the key update request or according to the information about the user plane uplink PDCP count value or the user plane downlink PDCP count value.

The embodiments of the invention provide a method, apparatus and system for updating a key, where a small base station monitors user plane uplink PDCP count value or user plane downlink PDCP count value of each UE connected with the small base station and transmits information about the user plane uplink PDCP count value or the user plane downlink PDCP count value so that the macro base station updates a key according to the information about the user plane uplink PDCP count value or the user plane downlink PDCP count value, or transmits a key update request as a function of the PDCP count values to a macro base station so that the macro base station updates a key in response to the key update request to thereby avoid security parameters from being reused so as to update the key in a timely manner and improve the security performance of the network.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of updating a key, the method comprising:
    a small base station monitoring user plane uplink Packet Data Convergence Protocol (PDCP) count value or user plane downlink PDCP count value of each User Equipment (UE) connected with the small base station; and the small base station transmitting a key update request as a function of the user plane uplink PDCP count value or the user plane downlink PDCP count value to a macro base station so that the macro base station updates a key in response to the key update request or the small base station transmitting information about the user plane uplink PDCP count value or the user plane downlink PDCP count value to the macro base station so that the macro base station updates a key according to the information about the user plane uplink PDCP count value or the user plane downlink PDCP count value.

2. The method according to claim 1, wherein the small base station transmitting the key update request as a function of the user plane uplink PDCP count value or the user plane downlink PDCP count value to the macro base station so that the macro base station updates a key in response to the key update request comprises:

the small base station transmitting the key update request including identifier information of a UE, for which a key needs to be updated, to the macro base station upon determining that the user plane uplink PDCP count value or the user plane downlink PDCP count value reaches a preset value; and the macro base station updating the key for the UE according to the identifier information upon reception of the key update request.

3. The method according to claim 1, wherein the small base station transmitting the information about the user plane uplink PDCP count value or the user plane downlink PDCP count value to the macro base station so that the macro base station updates a key according to the information about the user plane uplink PDCP count value or the user plane downlink PDCP count value comprises:

the small base station transmitting the user plane uplink PDCP count value or the user plane downlink PDCP count value of each UE to the macro base station dependent upon a preset report condition; and for each UE, the macro base station updating the key for the UE upon determining that one of the user plane uplink PDCP count value, the user plane downlink PDCP count value, a control plane uplink PDCP count value and a control plane downlink PDCP count value of the UE reaches a preset value.

4. The method according to claim 2, wherein the macro base station updating the key for the UE comprises:

the macro base station initiating an intra-cell handover procedure so that the macro base station calculating with the UE a new key for Radio Resource Control (RRC) message and user plane data; and the macro base station returning a key update response message carrying the new key to the small base station.

5. The method according to claim 2, wherein the method further comprises:

the UE transmitting no uplink data but decrypting received downlink data using the new key and the old key for a preset period of time after the key is updated; or the small base station neither transmitting downlink data to the UE nor scheduling the UE to transmit uplink data for a preset period of time after transmitting the key update request to the macro base station.

6. The method according to claim 3, wherein the preset report condition is that:

there is such at least one of the user plane uplink PDCP count value or the user plane downlink PDCP count value that changes by a preset threshold or more; or there has been a preset period of time since a last report.

7. The method according to claim 3, wherein the method further comprises:

the UE transmitting no uplink data but decrypting received downlink data using the new key and the old key for a preset period of time after the key is updated; or the macro base station transmitting a notification message to the small base station upon determining that the key is to be updated for the UE, and the small base station neither transmitting downlink data to the UE nor scheduling the UE to transmit uplink data for a preset period of time after receiving the notification message.

8. The method according to claim 3, wherein the macro base station updating the key for the UE comprises:

the macro base station initiating an intra-cell handover procedure so that the macro base station calculating with the UE a new key for Radio Resource Control (RRC) message and user plane data; and the macro base station returning a key update response message carrying the new key to the small base station.

9. A method of updating a key, the method comprising:

a macro base station receiving a key update request transmitted by a small base station to the macro base station as a function of user plane uplink Packet Data Convergence Protocol (PDCP) count value or the user plane downlink PDCP count value, or information transmitted by the small base station to the macro base station about the user plane uplink PDCP count value or the user plane downlink PDCP count value; and the macro base station updating a key in response to the key update request or according to the information about the user plane uplink PDCP count value or the user plane downlink PDCP count value.

10. The method according to claim 9, wherein the macro base station receiving the key update request transmitted by the small base station to the macro base station as a function of the user plane uplink PDCP count value or the user plane downlink PDCP count value comprises:

the macro base station receiving the key update request transmitted by the small base station to the macro base station upon the small base station determines that the user plane uplink PDCP count value or the user plane downlink PDCP count value reaches a preset value, wherein the key update request includes identifier information of a User Equipment (UE) for which a key needs to be updated; and the macro base station updating a key in response to the key update request comprises:

the macro base station updating the key for the UE according to the identifier information upon reception of the key update request.

11. The method according to claim 9, wherein the macro base station receiving the information transmitted by the small base station to the macro base station about the user plane uplink PDCP count value or the user plane downlink PDCP count value comprises:

the macro base station receiving the user plane uplink PDCP count value or the user plane downlink PDCP count value of each UE transmitted by the small base station dependent upon a preset report condition; and the macro base station updating a key according to the information about the user plane uplink PDCP count value or the user plane downlink PDCP count value comprises:
for each UE, the macro base station updating the key for the UE upon determining that one of the user plane uplink PDCP count value, the user plane downlink PDCP count value, a control plane uplink PDCP count value and a control plane downlink PDCP count value of the UE reaches a preset value.

12. The method according to claim 10, wherein the macro base station updating the key for the UE comprises:
the macro base station initiating an intra-cell handover procedure so that the macro base station calculates with the UE a new key for Radio Resource Control (RRC) message and user plane data; and
the macro base station returning a key update response message carrying the new key to the small base station.

13. The method according to claim 10, wherein the method further comprises:
the UE transmitting no uplink data but decrypting received downlink data using the new key and the old key for a preset period of time after the key is updated; or
the small base station neither transmitting downlink data to the UE nor scheduling the UE to transmit uplink data for a preset period of time after transmitting the key update request to the macro base station.

14. The method according to claim 11, wherein the preset report condition is that:
there is such at least one of the user plane uplink PDCP count value or the user plane downlink PDCP count value that changes by a preset threshold or more; or
there has been a preset period of time since a last report.

15. The method according to claim 11, wherein the method further comprises:
the UE transmitting no uplink data but decrypting received downlink data using the new key and the old key for a preset period of time after the key is updated; or
the macro base station transmitting a notification message to the small base station upon determining that the key is to be updated for the UE, and the small base station neither transmitting downlink data to the UE nor scheduling the UE to transmit uplink data for a preset period of time after receiving the notification message.

16. An apparatus for updating a key, the apparatus comprising:
a receiving unit configured to receive a key update request transmitted by a small base station to a macro base station as a function of user plane uplink Packet Data Convergence Protocol (PDCP) count value or user plane downlink PDCP count value, or information transmitted by the small base station to the macro base station about the user plane uplink PDCP count value or the user plane downlink PDCP count value; and
an updating unit configured to update a key in response to the key update request or according to the information about the user plane uplink PDCP count value or the user plane downlink PDCP count value.

17. The apparatus according to claim 16, wherein the receiving unit configured to receive the key update request transmitted by the small base station to the macro base station as a function of the user plane uplink PDCP count value or the user plane downlink PDCP count value is configured:
to receive the key update request transmitted by the small base station to the macro base station upon the small base station determines that the user plane uplink PDCP count value or the user plane downlink PDCP count value reaches a preset value, wherein the key update request includes identifier information of a User Equipment (UE) for which a key needs to be updated; and
the updating unit configured to update a key in response to the key update request is configured:
to update the key for the UE according to the identifier information upon reception of the key update request.

18. The apparatus according to claim 16, wherein the receiving unit configured to receive the information transmitted by the small base station to the macro base station about the user plane uplink PDCP count value or the user plane downlink PDCP count value is configured:
to receive the user plane uplink PDCP count value or the user plane downlink PDCP count value of each UE transmitted by the small base station dependent upon a preset report condition; and
the updating unit configured to update a key according to the information about the user plane uplink PDCP count value or the user plane downlink PDCP count value is configured:
for each UE, to update the key for the UE upon determining that one of the user plane uplink PDCP count value, the user plane downlink PDCP count value, a control plane uplink PDCP count value and a control plane downlink PDCP count value of the UE reaches a preset value.

19. The apparatus according to claim 17, wherein the updating unit configured to update the key for the UE is configured:
to initiate an intra-cell handover procedure to calculate with the UE a new key for Radio Resource Control (RRC) message and user plane data; and
to return a key update response message carrying the new key to the small base station.

20. The apparatus according to claim 19, wherein the updating unit is further configured:
to transmit a notification message to the small base station upon determining that the key is updated for the UE so that the small base station neither transmits downlink data to the UE nor schedules the UE to transmit uplink data for a preset period of time after receiving the notification message.

* * * * *